(12) United States Patent
Kolb

(10) Patent No.: US 7,464,700 B2
(45) Date of Patent: Dec. 16, 2008

(54) METHOD FOR COOLING AN INTERNAL COMBUSTION ENGINE HAVING EXHAUST GAS RECIRCULATION AND CHARGE AIR COOLING

(75) Inventor: John A. Kolb, Old Lyme, CT (US)

(73) Assignee: Proliance International Inc., New Haven, CT (US)

( * ) Notice: Subject to any disclaimer, the term of this patent is extended or adjusted under 35 U.S.C. 154(b) by 79 days.

(21) Appl. No.: 11/368,088

(22) Filed: Mar. 3, 2006

(65) Prior Publication Data
US 2007/0204614 A1 Sep. 6, 2007

(51) Int. Cl.
F02B 33/00 (2006.01)
F02B 29/04 (2006.01)
B60K 11/04 (2006.01)
B60H 3/00 (2006.01)
B60H 1/00 (2006.01)
F28D 7/10 (2006.01)

(52) U.S. Cl. .......................... 123/563; 60/599; 165/41; 165/42; 165/51; 165/140

(58) Field of Classification Search ............. 60/605.2, 60/599; 123/568.12, 568.11, 563, 41.29, 123/41.44; 165/41, 42, 173, 133, 140, 153, 165/159, 164, 80.2
See application file for complete search history.

(56) References Cited

U.S. PATENT DOCUMENTS

| | | | | |
|---|---|---|---|---|
| 3,006,979 | A * | 10/1961 | Rich ......................... | 165/80.2 |
| 3,147,800 | A * | 9/1964 | Tadewald .................... | 165/164 |
| 3,702,633 | A * | 11/1972 | Csathy ....................... | 165/159 |
| 4,236,492 | A * | 12/1980 | Tholen ....................... | 123/563 |
| 4,274,483 | A * | 6/1981 | Cottone et al. ............. | 165/153 |
| 4,736,727 | A | 4/1988 | Williams .................... | 123/563 |
| 4,805,693 | A | 2/1989 | Flessate ..................... | 165/153 |
| 4,938,303 | A | 7/1990 | Schaal et al. ............. | 123/41.48 |
| 5,036,668 | A * | 8/1991 | Hardy ......................... | 60/599 |
| 5,046,550 | A | 9/1991 | Boll et al. ................... | 165/41 |
| 5,046,554 | A | 9/1991 | Iwasaki et al. ............. | 165/40 |
| 5,062,473 | A | 11/1991 | Ostrand et al. ............. | 165/42 |
| 5,234,051 | A | 8/1993 | Weizenburger et al. ... | 165/41 |

(Continued)

FOREIGN PATENT DOCUMENTS

EP 522288 A1 * 1/1993

(Continued)

Primary Examiner—Thai-Ba Trieu
(74) Attorney, Agent, or Firm—DeLio & Peterson, LLC; Peter W. Peterson

(57) ABSTRACT

A system for cooling charge air from a turbo- or supercharger and exhaust gas recirculated from an exhaust gas recirculation valve in an internal combustion engine. The system includes a radiator and parallel charge air and exhaust gas heat exchanger units, the charge air heat exchanger unit having aluminum tubes and fins for air cooling the charge air, and the exhaust gas heat exchanger unit having stainless steel tubes and fins. The charge air heat exchanger and the exhaust gas heat exchanger units are each disposed adjacent the radiator, on the same or opposite sides. Alternatively, there is provided a pair of combined charge air cooler and exhaust gas cooler heat exchanger units, with a first heat exchanger unit having stainless steel tubes and fins, and a second heat exchanger unit having aluminum tubes and fins. The heat exchanger units are disposed on opposites sides of the radiator.

17 Claims, 14 Drawing Sheets

U.S. PATENT DOCUMENTS

| | | | |
|---|---|---|---|
| 5,267,624 A | 12/1993 | Christensen | 165/98 |
| 5,316,079 A | 5/1994 | Hedeen | 165/140 |
| 5,353,757 A | 10/1994 | Susa et al. | 123/41.29 |
| 5,526,873 A | 6/1996 | Marsais et al. | 165/140 |
| 5,566,748 A | 10/1996 | Christensen | 165/41 |
| 5,617,726 A | 4/1997 | Sheridan et al. | 60/605.2 |
| 5,657,817 A | 8/1997 | Heine et al. | 165/140 |
| 5,894,649 A * | 4/1999 | Lambert et al. | 165/173 |
| 6,003,315 A | 12/1999 | Bailey | 60/605.2 |
| 6,185,939 B1 * | 2/2001 | Coleman et al. | 60/605.2 |
| 6,192,686 B1 * | 2/2001 | Coleman et al. | 60/605.2 |
| 6,196,169 B1 | 3/2001 | Schreiner | 165/41.19 |
| 6,216,458 B1 | 4/2001 | Alger et al. | 60/605.2 |
| 6,216,461 B1 | 4/2001 | Shao et al. | 60/605.2 |
| 6,223,811 B1 | 5/2001 | Kodumudi et al. | 165/41 |
| 6,230,695 B1 * | 5/2001 | Coleman et al. | 123/568.12 |
| 6,244,256 B1 * | 6/2001 | Wall et al. | 123/568.12 |
| 6,330,747 B1 * | 12/2001 | Lambert et al. | 165/173 |
| 6,354,084 B1 | 3/2002 | McKinley et al. | 60/605.2 |
| 6,360,732 B1 | 3/2002 | Bailey et al. | 60/605.2 |
| 6,367,256 B1 | 4/2002 | McKee | 60/605.2 |
| 6,408,939 B1 | 6/2002 | Sugimoto et al. | 165/140 |
| 6,422,219 B1 | 7/2002 | Savonen et al. | 60/605.2 |
| 6,430,929 B2 | 8/2002 | Martin | 60/605.2 |
| 6,513,484 B1 * | 2/2003 | Buckland et al. | 60/605.2 |
| 6,516,787 B1 | 2/2003 | Dutart et al. | 123/568.11 |
| 6,612,293 B2 * | 9/2003 | Schweinzer et al. | 123/568.12 |
| 6,615,604 B2 | 9/2003 | Neufang | 165/140 |
| 6,619,379 B1 | 9/2003 | Ambros et al. | 165/41 |
| 6,644,388 B1 * | 11/2003 | Kilmer et al. | 165/133 |
| 6,675,782 B1 | 1/2004 | Persson | 60/605.2 |
| 6,719,037 B2 | 4/2004 | Crook | 165/79 |
| 6,748,741 B2 | 6/2004 | Martin et al. | 60/605.2 |
| 6,786,210 B2 | 9/2004 | Kennedy et al. | 60/605.2 |
| 6,792,898 B2 | 9/2004 | Banzhaf et al. | 123/41.1 |
| 6,832,643 B1 * | 12/2004 | Zobel et al. | 165/41 |
| 6,883,314 B2 * | 4/2005 | Callas et al. | 60/599 |
| 6,951,240 B2 * | 10/2005 | Kolb | 165/42 |
| 6,957,689 B2 | 10/2005 | Ambros et al. | 165/41 |
| 7,131,263 B1 * | 11/2006 | Styles | 60/605.2 |
| 7,178,579 B2 * | 2/2007 | Kolb | 165/41 |
| 7,228,885 B2 * | 6/2007 | Kolb et al. | 165/42 |
| 2001/0017033 A1 | 8/2001 | McKinley et al. | 60/605.2 |
| 2002/0020365 A1 | 2/2002 | Wooldridge | 165/41 |
| 2003/0106669 A1 | 6/2003 | Ambros et al. | 165/42 |
| 2003/0188727 A1 * | 10/2003 | van Nieuwstadt | 60/605.2 |
| 2004/0104007 A1 | 6/2004 | Kolb | 165/41 |
| 2004/0112345 A1 | 6/2004 | Bertilsson et al. | 60/605.2 |
| 2004/0244782 A1 | 12/2004 | Lewallen | 60/605.2 |
| 2005/0109484 A1 | 5/2005 | Kolb | 165/42 |
| 2005/0109485 A1 * | 5/2005 | Kolb et al. | 165/42 |
| 2005/0257921 A1 | 11/2005 | Hu | 165/140 |
| 2006/0278377 A1 * | 12/2006 | Martins et al. | 165/140 |
| 2007/0261400 A1 | 11/2007 | Digele et al. | 60/320 |

FOREIGN PATENT DOCUMENTS

| | | | |
|---|---|---|---|
| JP | 10122501 A * | 5/1998 | |
| JP | 11264688 | 9/1999 | |
| WO | WO 2007055644 A1 * | 5/2007 | |

* cited by examiner

METHOD FOR COOLING AN INTERNAL COMBUSTION ENGINE HAVING EXHAUST GAS RECIRCULATION AND CHARGE AIR COOLING

BACKGROUND OF THE INVENTION

1. Field of the Invention

This invention relates to a cooling system for internal combustion engines used in trucks and other motor vehicles and, in particular, to a cooling system utilizing a charge air cooler and an exhaust gas cooler in combination with a radiator.

2. Description of Related Art

Stricter emissions requirements have forced the use of partial exhaust gas recirculation as a means of achieving more complete combustion, and this has necessitated the cooling of the recirculated exhaust gas before introducing it into the engine intake manifold. FIG. 1 shows a typical heavy duty truck cooling system having a liquid-cooled exhaust gas recirculation (EGR) cooler. The engine cooling system comprises an internal combustion engine 20 utilizing conventional liquid engine coolant. The liquid coolant heated by operation of the engine exits the engine through line or hose 61 and passes through a thermostat 30. If the coolant is below the thermostat set temperature it is passed through line 63 to coolant pump 32 and back through line 65 to the engine. If the coolant is above the thermostat set temperature, it is sent through line 62 to otherwise conventional air cooled radiator 22 where ambient air flow 60, 60*a* and 60*b* passes through the radiator by means of a fan (not shown) as well as movement of the vehicle in which the engine is mounted. The cooled liquid coolant then passes through lines 57 and 59 back to the coolant pump before returning to the engine.

For mixture with the fuel, the engine utilizes inlet air 40 that passes through a filter (not shown) and is compressed by a turbo- or supercharger. The engine system depicted herein utilizes engine exhaust gases exiting through lines 50 and 54 in a turbocharger in which turbine 26 drives compressor 28. After passing through the turbine blades, the exhaust gas exits through line 55 to the exhaust system (not shown). After compression, the charge air passes through line 42 to air-to-air charge air cooler (CAC) 24 mounted upstream of radiator 22. The cooled charge air then exits CAC 24 through line 44.

A portion of the exhaust gas exiting through line 50 passes through line 52 and through an EGR valve 48. The exhaust gas then passes through line 56 to EGR cooler 34, which is a liquid-to-air heat exchanger that cools the hot exhaust gases using the cooled liquid engine coolant entering through line 57. Because brazed aluminum heat exchanger construction is not capable of withstanding the high exhaust gas temperatures, typically, such an EGR cooler must be of high-temperature heat exchanger construction; that is, made of materials able to withstand higher temperatures than brazed aluminum, such as brazed stainless steel, brazed cupro-nickel, brazed copper, and the like. The cooled recirculated exhaust gas then exits the EGR cooler through line 58, where it mixes with the cooled charge air from line 44. The mixture of cooled recirculated exhaust gas and charge air then proceeds through line 46 to the intake manifold 21 of engine 20 for mixture with the fuel and then to the engine combustion chambers.

The system has two disadvantages: 1) the high cost of stainless steel or other high temperature EGR cooler construction and 2) the cooling limitation resulting from the use of engine coolant at approximately 180° F.

FIG. 2 shows another prior art heavy duty truck cooling system in which the exhaust gas which is to be recirculated is mixed with the hot charge air coming from the turbocharger for cooling in an air-cooled heat exchanger. Since the liquid engine coolant does not need to cool the exhaust gas, the liquid engine coolant passes through line 57 from radiator 22 and back to coolant pump 32 for return to the engine. The hot exhaust gas exiting EGR valve 48 passes through line 56 where it combines and mixes with compressed, heated charge air in line 41 exiting compressor 28. The combined heated exhaust gas and charge air then passes through line 43 to a brazed stainless steel combination exhaust gas recirculation and charge air cooler 24' upstream of radiator 22. Alternatively, the combination exhaust gas recirculation and charge air cooler may be made of other high temperature construction such as the aforementioned brazed cupro-nickel or brazed copper. After the charge air and exhaust gas are cooled by ambient air 60 passing through CAC 24', the cooled combined exhaust gas and charge air then pass through line 45 to engine intake manifold 21. This approach does allow the recirculated exhaust gas and charge air to be cooled to a temperature close to that of the ambient cooling air, which will always be much less than that of the engine coolant. However, it does not solve the expense problem related to high temperature-resistant construction and, in fact, increases the expense by requiring stainless steel or other expensive high temperature material to be used in a very large combination EGR/CAC.

In addition to having high material costs, prior systems and methods of cooling charge air and/or recirculated exhaust gases in an internal combustion engine have not been able to individually tailor thermal performance of individual heat exchanger units in a space-saving package.

SUMMARY OF THE INVENTION

Bearing in mind the problems and deficiencies of the prior art, it is therefore an object of the present invention to provide an improved system and method of cooling an internal combustion engine, including charge air cooling and exhaust gas cooling, which achieves cooling of the charge air and the recirculated exhaust gas to near ambient temperatures.

It is another object of the present invention to provide a system and method of cooling an internal combustion engine, including charge air cooling and exhaust gas cooling, which allows the use of lower cost materials for the charge air and exhaust gas coolers.

A further object of the present invention is to provide a system and method of cooling charge air and recirculated exhaust gas in an internal combustion engine which saves space in a combined radiator, CAC and EGR cooler package.

Yet another object of the present invention is to provide a combined heat exchanger package for an internal combustion engine that permits tailoring of thermal performance of individual heat exchanger units within the package.

Still other objects and advantages of the invention will in part be obvious and will in part be apparent from the specification.

The above and other objects, which will be apparent to those skilled in the art, are achieved in the present invention which is directed to a method and apparatus for cooling charge air from a turbo- or supercharger and exhaust gas recirculated from an exhaust gas recirculation valve in an internal combustion engine comprising providing a radiator for air cooling of liquid engine coolant from the internal combustion engine and providing parallel charge air and exhaust gas heat exchanger units. The charge air heat exchanger unit has aluminum tubes and fins for air cooling the charge air, and the exhaust gas heat exchanger unit having tubes and fins made of a material resistant to higher operating temperatures than aluminum for air cooling the exhaust gas.

The charge air heat exchanger and the exhaust gas heat exchanger units are each disposed adjacent a face of the radiator to permit ambient air to flow in series through the radiator and the charge air and exhaust gas heat exchanger units. The method then includes passing the charge air from the turbo- or supercharger through the charge air heat exchanger unit to cool the charge air, passing the exhaust gas from the exhaust gas recirculation valve through the exhaust gas heat exchanger unit to cool the exhaust gas, and combining the cooled charge air and cooled exhaust gas for passage into an intake manifold on the engine.

Preferably, the exhaust gas heat exchanger unit has tubes and fins made of stainless steel. The radiator may comprise two units, with the charge air heat exchanger unit being disposed adjacent a face of one radiator unit and the exhaust gas heat exchanger unit being disposed adjacent a face of the other radiator unit. The charge air heat exchanger unit and the exhaust gas heat exchanger unit may have different core styles, such as different core depth, type of fins, fin spacing, fin count, tube spacing and tube count.

The charge air and exhaust gas heat exchanger units may be disposed in parallel adjacent a same face of the radiator to permit ambient air to flow in series through the radiator and the charge air and exhaust gas heat exchanger units.

The charge air and exhaust gas heat exchanger units may be disposed downstream of the radiator with respect to ambient air flow to permit ambient air to flow in series first through the radiator and subsequently through the charge air and exhaust gas heat exchanger units, or vice-versa.

The charge air and exhaust gas heat exchanger units may be disposed adjacent opposite faces of the radiator, with the charge air heat exchanger unit being disposed upstream of the radiator and the exhaust gas heat exchanger unit being disposed downstream of the radiator. This permits ambient air to flow in series first through charge air heat exchanger unit having aluminum tubes and fins and then through the radiator, and permits ambient air to flow in series through the radiator and subsequently through the exhaust gas heat exchanger unit having tubes and fins made of the higher temperature resistant material. The radiator may alternately comprise two units, with the charge air heat exchanger unit being disposed upstream adjacent one radiator unit and the exhaust gas heat exchanger unit being disposed downstream adjacent the other radiator unit. The charge air heat exchanger unit and the exhaust gas heat exchanger unit may have different core styles, and each radiator unit may have a different core style.

Alternatively, the charge air and exhaust gas heat exchanger units may be a first set disposed downstream of the radiator with respect to ambient air flow to permit ambient air to flow in series first through the radiator and subsequently through the first set of charge air and exhaust gas heat exchanger units. There may be further provided a second set of charge air and exhaust gas heat exchanger units, wherein both heat exchanger units in the second set have aluminum tubes and fins for air cooling the charge air and the exhaust gas. The second set of charge air and exhaust gas heat exchanger units are disposed upstream of the radiator to permit ambient air to flow in series first through the second set of charge air and exhaust gas heat exchanger units and subsequently through the radiator. The partially cooled charge air from the charge air heat exchanger unit downstream of the radiator is passed through the second charge air heat exchanger unit upstream of the radiator to further cool the charge air. The partially cooled exhaust gas from the exhaust gas heat exchanger unit downstream of the radiator is passed through the second exhaust gas heat exchanger unit upstream of the radiator to further cool the exhaust gas before combining the cooled charge air and cooled exhaust gas for passage to the intake manifold of the engine. At least one of the charge air heat exchanger units or exhaust gas heat exchanger units may have a different core style. The radiator may comprises two units, with the first set of charge air and exhaust gas heat exchanger units downstream of the radiator being disposed adjacent one radiator unit and the second set of charge air and exhaust gas heat exchanger units upstream of the radiator being disposed adjacent the other radiator unit. Each radiator unit may have a different core style.

In another aspect, the present invention is directed to a method and apparatus for cooling charge air from a turbo- or supercharger and exhaust gas recirculated from an exhaust gas recirculation valve in an internal combustion engine comprising providing a radiator for air cooling of liquid engine coolant from the internal combustion engine and providing a pair of combined charge air cooler and exhaust gas cooler heat exchanger units. A first one of the heat exchanger units has tubes and fins made of a material able to withstand higher operating temperatures than aluminum, and the second of the heat exchanger units has aluminum tubes and fins. The heat exchanger units are disposed adjacent the radiator to permit ambient air to flow in series through the radiator and the heat exchanger units. The method includes combining the charge air from the turbo- or supercharger with the exhaust gas recirculated from the exhaust gas recirculation valve, passing the combined charge air and exhaust gas through the first heat exchanger unit having the tubes and fins made of the higher temperature resistant material to partially cool the combined charge air and exhaust gas, passing the partially cooled combined charge air and exhaust gas through the second heat exchanger unit having the aluminum tubes and fins to cool the combined charge air and exhaust gas, and passing the combined cooled charge air and exhaust gas into an intake manifold on the engine.

The heat exchanger unit having tubes and fins made of the higher temperature resistant material, preferably stainless steel, may be disposed downstream of the radiator with respect to ambient cooling air flow to permit ambient air to flow in series first through the radiator and subsequently through the heat exchanger unit having tubes and fins made of the higher temperature resistant material. The heat exchanger unit having aluminum tubes and fins may be disposed upstream of the radiator with respect to ambient cooling air flow to permit ambient air to flow in series first through the heat exchanger unit having aluminum tubes and fins and subsequently through the radiator.

The radiator may comprises two units, with the first heat exchanger unit being disposed adjacent a face of one radiator unit and the second heat exchanger unit being disposed adjacent a face of the other radiator unit. Each of the first and second heat exchanger units may have a different core style, and each radiator unit may have a different core style.

In a further aspect, the present invention provides a method and apparatus for cooling engine coolant and charge air from a turbo- or supercharger in an internal combustion engine comprising providing a radiator for cooling engine coolant having opposite front and rear core faces through which ambient air flows, and opposite upper and lower ends adjacent the faces, and providing a charge air cooler for cooling charge air having upper and lower units. Each charge air cooler unit has opposite front and rear core faces through which ambient air may flow, and opposite upper and lower ends adjacent the faces. The upper charge air cooler unit is disposed in overlapping relationship and adjacent to the upper end of the radiator, wherein one face at the upper end of the radiator is disposed adjacent one face of the upper charge air cooler unit, and the lower charge air cooler unit is disposed in overlapping relationship and adjacent to the lower end of the radiator with the upper and lower ends of the lower charge air cooler unit being oriented in the same direction as the upper and lower ends of the radiator, wherein the other face at the lower end of the radiator is disposed adjacent one face of the lower charge air cooler unit. Each charge air cooler unit has a different core style selected from the group consisting of core depth, type of fins, fin spacing, fin count, tube spacing and tube count. The charge air cooler units are operatively connected such that the charge air may flow therebetween. The method includes flowing the engine coolant through the radiator to cool the engine coolant, flowing the charge air from the turbo- or supercharger in sequence through the charge air heat exchanger units to cool the charge air, and flowing cooling air through the heat exchanger assembly such that the cooling air flows in series through the upper end of the radiator and the upper charge air cooler unit, and the cooling air flows in series through the lower charge air cooler unit and the lower end of the radiator. At least one of the charge air cooler units may include cooling for recirculated exhaust gas.

In yet another aspect, the present invention provides a method and apparatus for cooling engine coolant and charge air from a turbo- or supercharger in an internal combustion engine comprising providing a radiator having upper and lower units for cooling engine coolant, with each radiator unit having opposite front and rear core faces through which ambient cooling air flows, a depth between the front and rear faces, and opposite upper and lower ends adjacent the faces. The radiator units are operatively connected such that the engine coolant may flow therebetween. There is also provided a charge air cooler having upper and lower units for cooling charge air, with each charge air cooler unit having opposite front and rear core faces through which cooling air may flow, and opposite upper and lower ends adjacent the faces. The upper charge air cooler unit is disposed in overlapping relationship and adjacent to the upper radiator unit with the upper and lower ends of the upper charge air cooler unit, wherein one face of the upper radiator unit is disposed adjacent one face of the upper charge air cooler unit, and the lower charge air cooler unit is disposed in overlapping relationship and adjacent to the lower radiator unit, wherein the other face of the lower radiator unit is disposed adjacent one face of the lower charge air cooler unit. Each charge air cooler unit has a different core style selected from the group consisting of core depth, type of fins, fin spacing, fin count, tube spacing and tube count. The charge air cooler units are operatively connected such that the charge air may flow therebetween. The method then includes flowing the engine coolant in sequence through the radiator units to cool the engine coolant, flowing the charge air from the turbo- or supercharger in sequence through the charge air heat exchanger units to cool the charge air, and flowing cooling air through the heat exchanger assembly such that the cooling air flows in series through the upper radiator unit and the upper charge air cooler unit, and the cooling air flows in series through the lower charge air cooler unit and the lower radiator unit. At least one of the charge air cooler units may include cooling for recirculated exhaust gas. Each radiator unit may have a different core style.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiments of the present invention, reference will be made herein to FIGS. 3-13 of the drawings in which like numerals refer to like features of the invention.

The management of airflow through an air cooled heat exchanger or packaged group of heat exchangers is important to the heat transfer performance of the heat exchanger unit or package. The development of airflow paths that optimize temperature potential is vital in the design of space-saving cooling systems within the constraints of typical fan/shroud arrangements in heavy-duty trucks.

Figure 3:
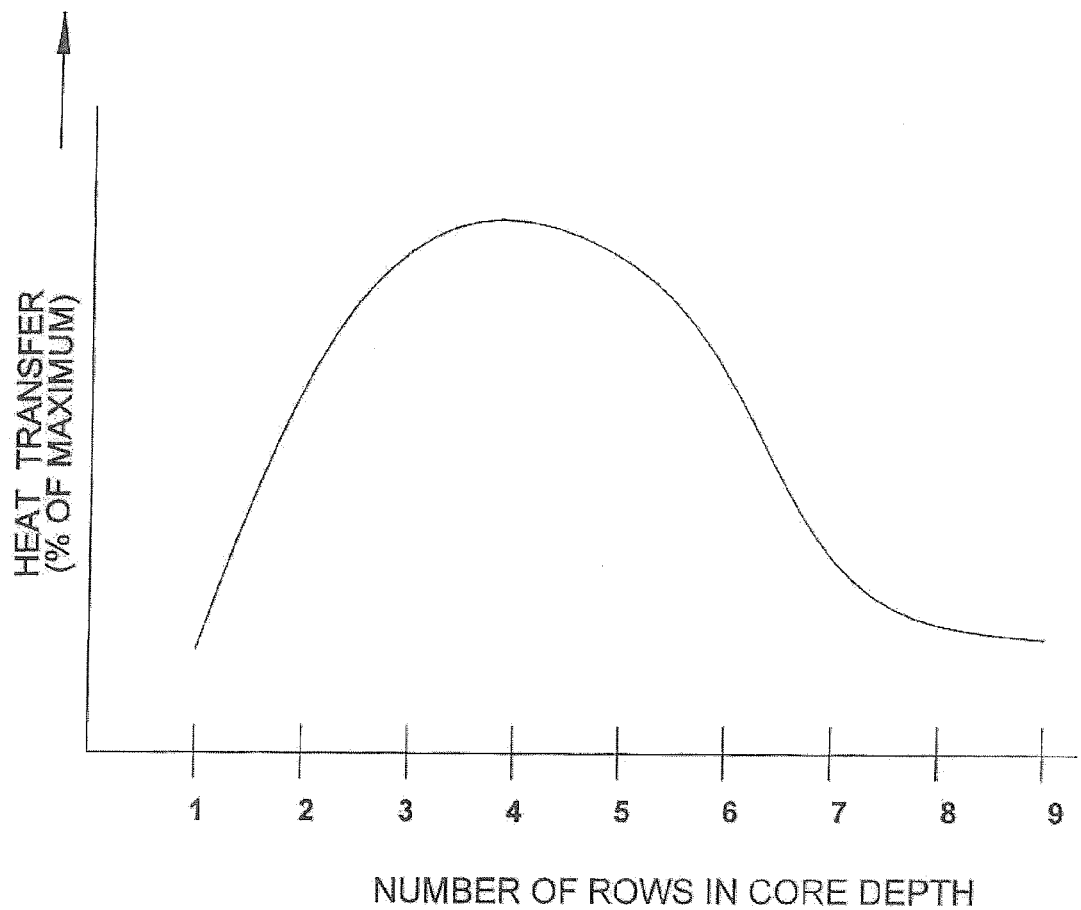
FIG. 3 is a graphical depiction of percent of maximum heat transfer as a function of number of rows of tubes in a single heat exchanger core.

Before considering airflow in the EGR/CAC/radiator heat exchanger packages disclosed herein, it is useful to examine airflow in a single core heat exchanger. FIG. 3 depicts the relationship of heat transfer as a function of number of rows of tubes in a heat exchanger core. A vehicle radiator having only one row of core tubes is initially assumed, wherein the depth in the direction of airflow is 0.50 in. (13 mm). If the tube spacing across the face of the core is about 0.44 in. (11 mm) and the fin spacing is about 14 fins per in. (5.5 fins/cm), then the airflow through the core, caused either by the action of a fan or by ram air as a result of vehicle motion, will be reasonably high. If increased heat transfer performance is desired, a radiator with an additional row of tubes may be used, making the core two rows deep. The cooling airflow will decrease slightly because of the added resistance of the deeper core, but the overall heat transfer will be greatly increased. However, as illustrated in FIG. 3, as the core is made even deeper, to three, four, five and six rows deep, cooling air flow is greatly reduced, to the point where adding another row will result in decreased, rather than increased, heat transfer performance. This occurs because with the low airflow and deep core, the cooling air reaching the last row of tubes is already heated to the point where it is ineffective in creating further cooling. In such a case, improved performance can be achieved by reducing the core depth to manage, or increase, the cooling airflow, and by other methods and means, discussed further below.

Figure 4:
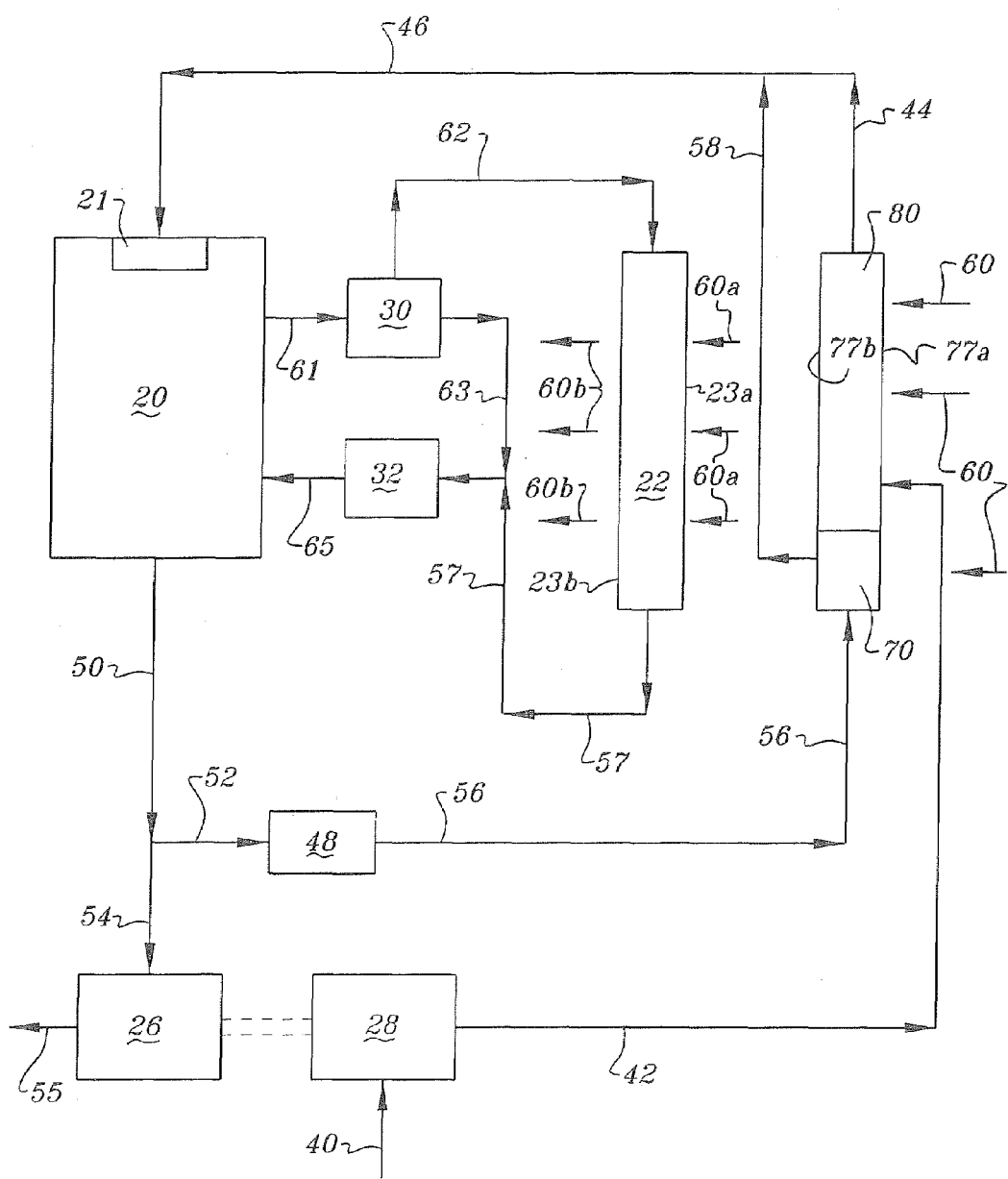
FIG. 4 is a partially schematic view of one embodiment of the internal combustion engine cooling system of the present invention showing in side elevational view the relative placement of exhaust gas and charge air coolers with respect to the radiator.

The internal combustion engine cooling system of the present invention achieves cooling of the charge air and the recirculated exhaust gas to near ambient temperatures, but permits the use of lower cost materials overall. FIG. 4 shows a first embodiment of the cooling system in which the air-cooled stainless steel or other high temperature-resistant exhaust gas cooler is separate from, and in parallel with, an aluminum charge air cooler, with respect to the cooling ambient air flow. As used herein, the term "ambient air" includes all of the cooling air as it passes through the radiator, exhaust gas cooler and charge air cooler heat exchanger units, even though it is heated as it passes through the fins of the heat exchanger units. Instead of combining the hot exhaust gas from EGR valve 48 with the heated charge air, or separately cooling the heated exhaust gas utilizing the liquid engine coolant, the heated exhaust gas passes through line 56 to an air-to-air exhaust gas heat exchanger 70 for cooling. The term "line" as used herein is intended to include hoses, tubing, piping and the like typically used to carry fluids in an internal combustion engine environment, such as the exhaust gas, charge air and liquid coolant described herein. Exhaust gas cooler 70 is disposed upstream of radiator 22 and receives inlet ambient cooling air 60. Radiator 22 is typically a down flow type radiator, wherein engine coolant enters through an upper manifold extending substantially the entire width of the radiator, is then distributed in the core through vertical, downwardly extending tubes connected by cooling fins, so that ambient cooling air may flow from the front face 23a of the core through and out of the rear face 23b. After being cooled by the ambient air, the coolant then collects in an attached lower manifold also extending across the width of the radiator. Alternatively, the radiator may be an up-flow type radiator, with coolant flow in the opposite direction, or a cross flow type radiator with coolant flow through core tubes extending horizontally between horizontally opposed manifolds.

In parallel with and above exhaust gas cooler 70, and also in front of and in series with radiator 22 with respect to the ambient air flow, charge air cooler heat exchanger 80 receives the heated, compressed charge air through line 42, where it is also cooled by ambient air 60 entering through the CAC/EGR cooler front face 77a. As a result, ambient air 60a exiting from the CAC/EGR cooler rear face 77b is heated by both the exhaust gas and charge air coolers before it passes through radiator 22, where it is further heated and exits 60b from the radiator. The cooled exhaust gas exits exhaust gas cooler 70 through line 58, and the cooled charge air exits charge air cooler 80 through line 44. The cooled charge air then combines with the cooled exhaust gas and passes through line 46 to engine intake manifold 21. Alternatively, the EGR cooler 70 and CAC 80 may be disposed on the opposite side of radiator 22, i.e., downstream of the radiator with respect to the ambient air flow.

Figure 1:
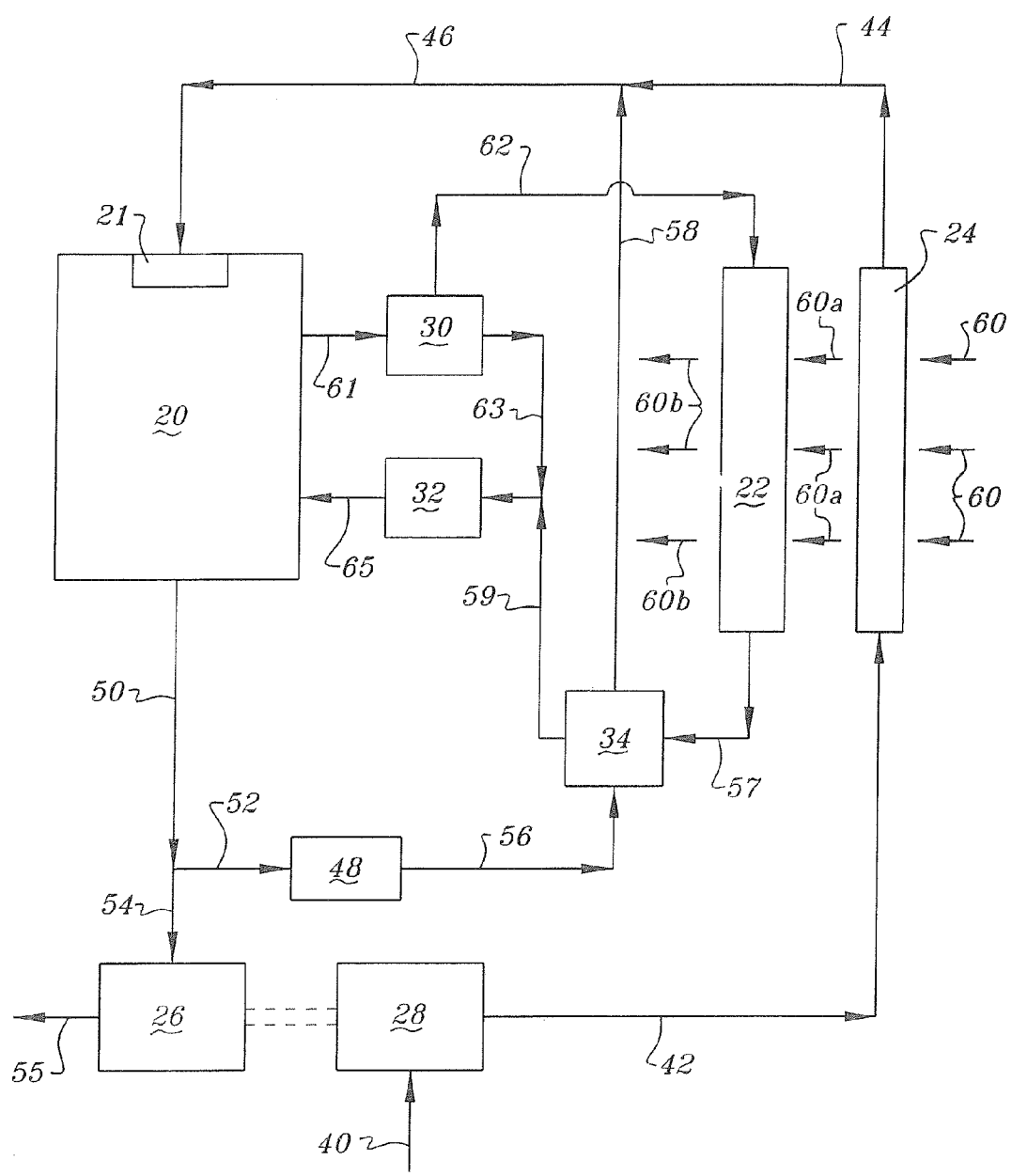
FIG. 1 is a partially schematic view of a prior art internal combustion engine cooling system.
Figure 2:
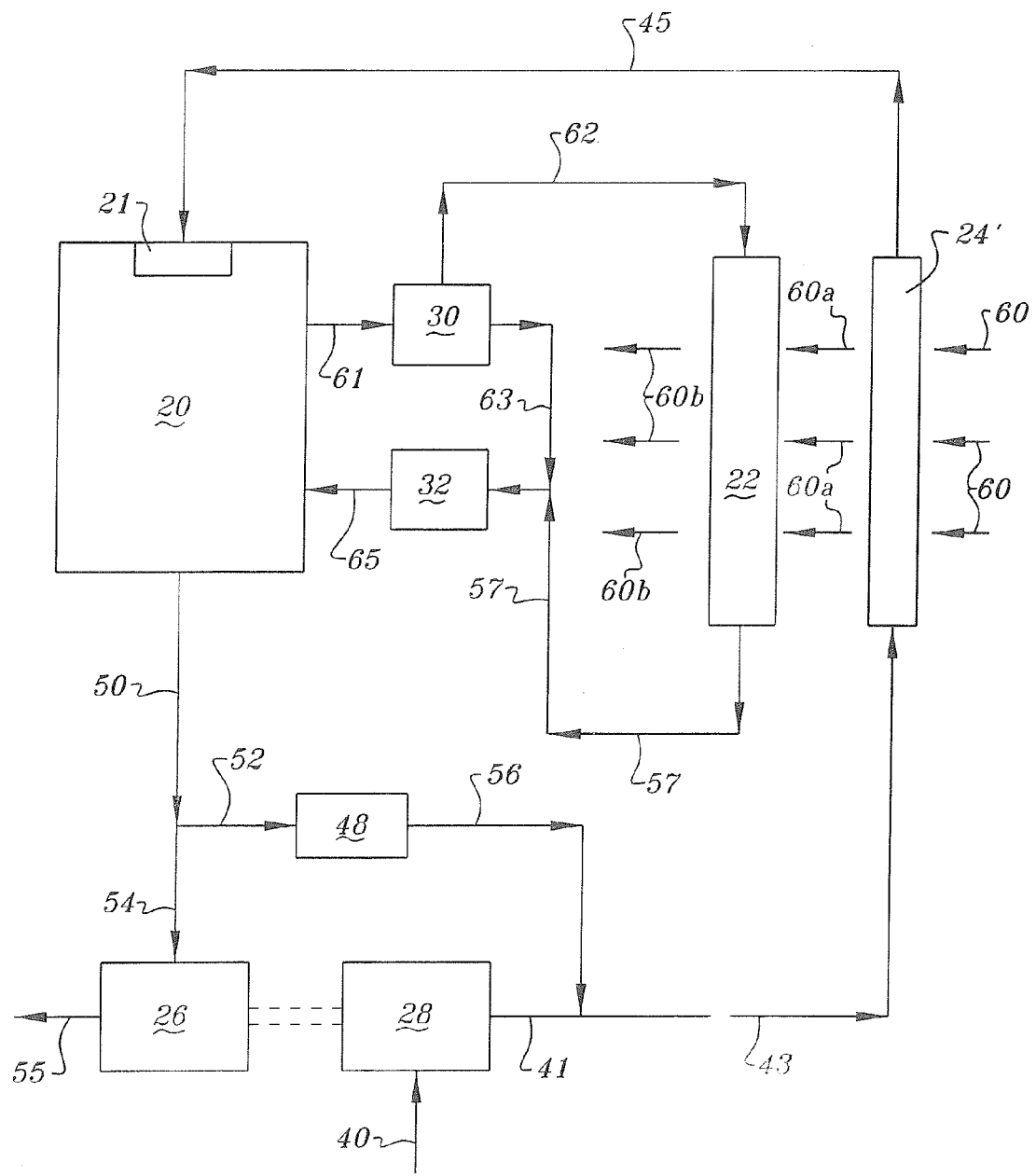
FIG. 2 is a partially schematic view of another prior art internal combustion engine cooling system showing in side elevational view the relative placement of a combined exhaust gas and charge air cooler with respect to the radiator.

In this embodiment, the recirculated exhaust gas and the charge air are combined after the charge air cooler, rather than before it as in the prior art system of FIG. 2. This system and method avoid having to make a combination exhaust gas and charge air cooler entirely out of stainless steel or other high temperature-resistant material. Instead, while the exhaust gas cooler is still made of stainless steel or the like, the charge air cooler may be made of aluminum.

Figure 5:
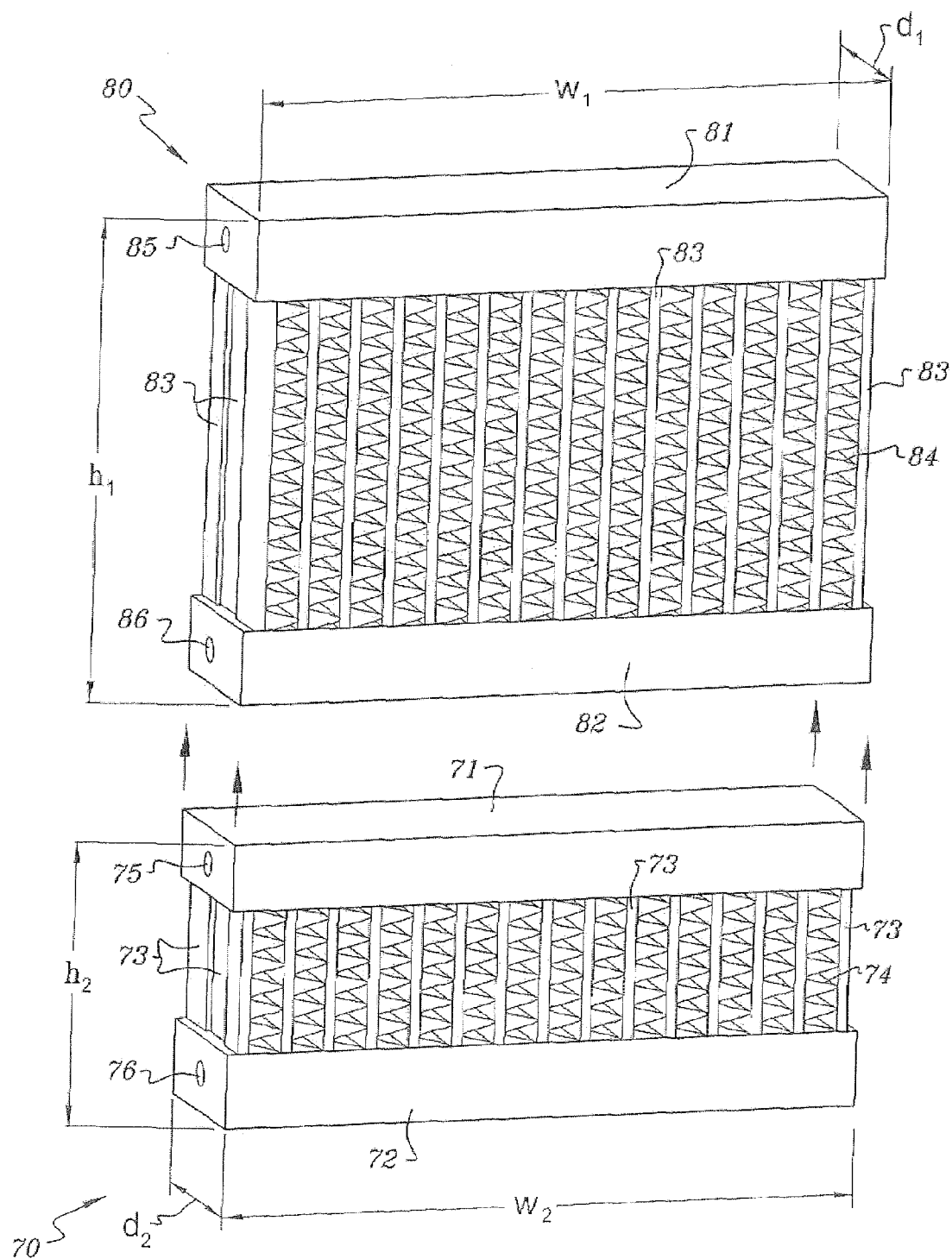
FIG. 5 is a perspective view of the charge air cooler and EGR gas cooler used in some embodiments of the internal combustion engine cooling system of the present invention.

The radiator, CAC and EGR cooler shown in the embodiment of FIG. 4 (as well as in the subsequent embodiments described below) are preferably secured to each other to create a combined heat exchanger package. The air-to-air heat exchanger units used for the exhaust gas cooler 70 and charge air cooler 80 are shown in more detail in FIG. 5. Charge air cooler 80 includes upper and lower horizontally extending manifolds 81, 82 respectively, which distribute or collect the charge air passing through spaced, vertically extending tubes 83 connecting the manifolds. These tubes may be two (2) rows deep, as shown in FIG. 5, or any other configuration, to achieve desired core depth $d_1$. A serpentine cooling fin array 84 (also of depth $d_1$) between adjacent tubes 83 extending across the face of charge air cooler 80 comprises the charge air cooler core, which transfers the heat from the charge air within the tubes to the ambient air passing between the tubes 83 and over the fins 84. The vertical spacing between the serpentine fins determines the desired fin count. The fins may be of the louvered, lanced-offset, wavy (non-louvered) or other type, or plate fins may be used instead. The manifolds have openings 85, 86 for passage of charge air into or out of the manifolds. The CAC may be configured as an upflow unit, where heated charge air is received in inlet 86 of manifold 82 where it passes upward through tubes 83 and from manifold 81 through outlet 85 as cooled charge air. Alternatively, the CAC may be configured as a downflow unit, where the heated charge air flow is received in inlet 85 and flows in a reverse direction out through outlet 86 as cooled charge air.

In a construction analogous to that of the charge air cooler, exhaust gas cooler 70 has upper and lower manifolds 71 and 72, with the former having inlet/outlet 75 and the latter having inlet/outlet 76. Tubes 73 carry the exhaust gas between manifolds 71 and 72, and fins 74 between adjacent tubes 73 permit passage of the cooling ambient air therebetween to cool the hot exhaust gases passing within tube 73. The core has depth $d_2$, and tubes 73 and fins 74 may be modified as described in connection with CAC 80. As with the charge air cooler, EGR cooler 70 may be set up as a downflow unit, so that the hot exhaust gases are passed through inlet 75 downward through the tubes and cooled exhaust gas passes outward through outlet 76, or as an upflow unit where the exhaust gas travels in the reverse direction.

As shown in FIG. 5, both exhaust gas cooler 70 and charge air cooler 80 have a horizontal width, measured in the direction of the manifolds, which is greater than the vertical height of each of the units, measured between the manifolds. Improved heat exchanger performance as a result of reduced charge air pressure drop, may be obtained by utilizing tubes which are as short as possible and as numerous as possible, given the configuration of the heat exchanger units. As shown in this embodiment, both the exhaust gas and charge air coolers employ tubes which are oriented with the shorter vertical height of each of the units so that there is a larger number of shorter tubes. Alternatively, both the exhaust gas and charge air coolers may be cross-flow units with exhaust gas flow through horizontally oriented tubes extending between vertically oriented manifolds on either side of the charge air cooler.

Preferably, charge air cooler 80 and exhaust gas cooler 70 are sized so that their respective widths $w_1$ and $w_2$ are each the same as the width of the radiator with which they are packaged. Preferably, CAC 80 and EGR cooler 70 are connected to each other, as indicated by the arrows, to create a single unit that is positioned adjacent to the radiator. The combined heights of the charge air cooler 80 and EGR cooler 70, $h_1$ and $h_2$ respectively, may be up to the height of the radiator. Typically, the height $h_1$ of the charge air cooler is greater than the height $h_2$ of the exhaust gas cooler 70 when there are greater cooling requirements for the charge air versus the recirculated exhaust gas.

Figure 5A:
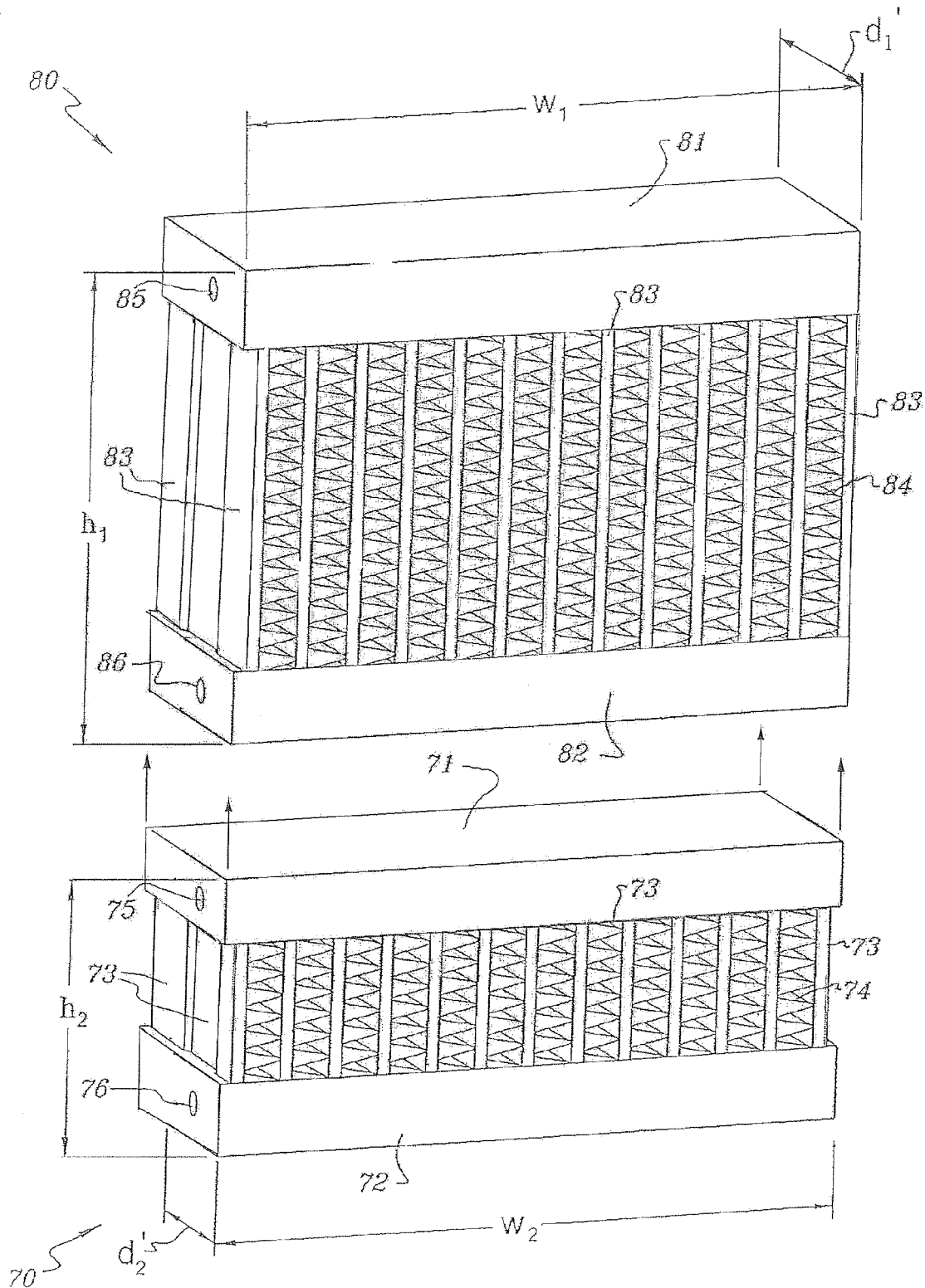
FIG. 5a is a modification of FIG. 5, and shows different core depths, different tube spacing and different tube count for the charge air cooler and EGR cooler.

In addition to modifying the heights and widths of the CAC and EGR coolers, the cores of each may be modified as desired to achieve the desired thermal cooling properties for the combined radiator/CAC/EGR cooler package. For example, the core depths, the type of fins, the fin spacing and count, and the tube spacing and count for each CAC and EGR cooler may be the same as or different from other CAC and EGR coolers in the package. FIG. 5a is a modification of FIG. 5, and shows different core depths $d_1'$ and $d_2'$, and different tube spacing and different tube count across the widths $w_1$ and $w_2$ of the CAC unit 80 and EGR cooler unit 70, respectively.

The manifolds, tubes and fins of charge air cooler 80 may be made of aluminum, either as a conventional fully brazed CAC or with brazed tubes and fins and grommeted tube-to-header joints. The latter is disclosed in U.S. Pat. Nos. 5,894,649, 6,330,747 and 6,719,037, the disclosures of which are hereby incorporated by reference. Because the exhaust gases to be cooled are considerably hotter than the charge air to be cooled by charge air cooler 80, exhaust gas cooler 70 is preferably not made of aluminum, and instead the manifolds, tubes and fins are made of stainless steel or other high temperature-resistant material for additional heat resistance and product life. Since only the portion of the heat exchanger package used to cool the exhaust gas is made of stainless steel or the like, the cost of the combined exhaust gas cooler 70 and charge air cooler 80 is less, since the charge air cooler portion is made of lower cost aluminum.

Figure 6:
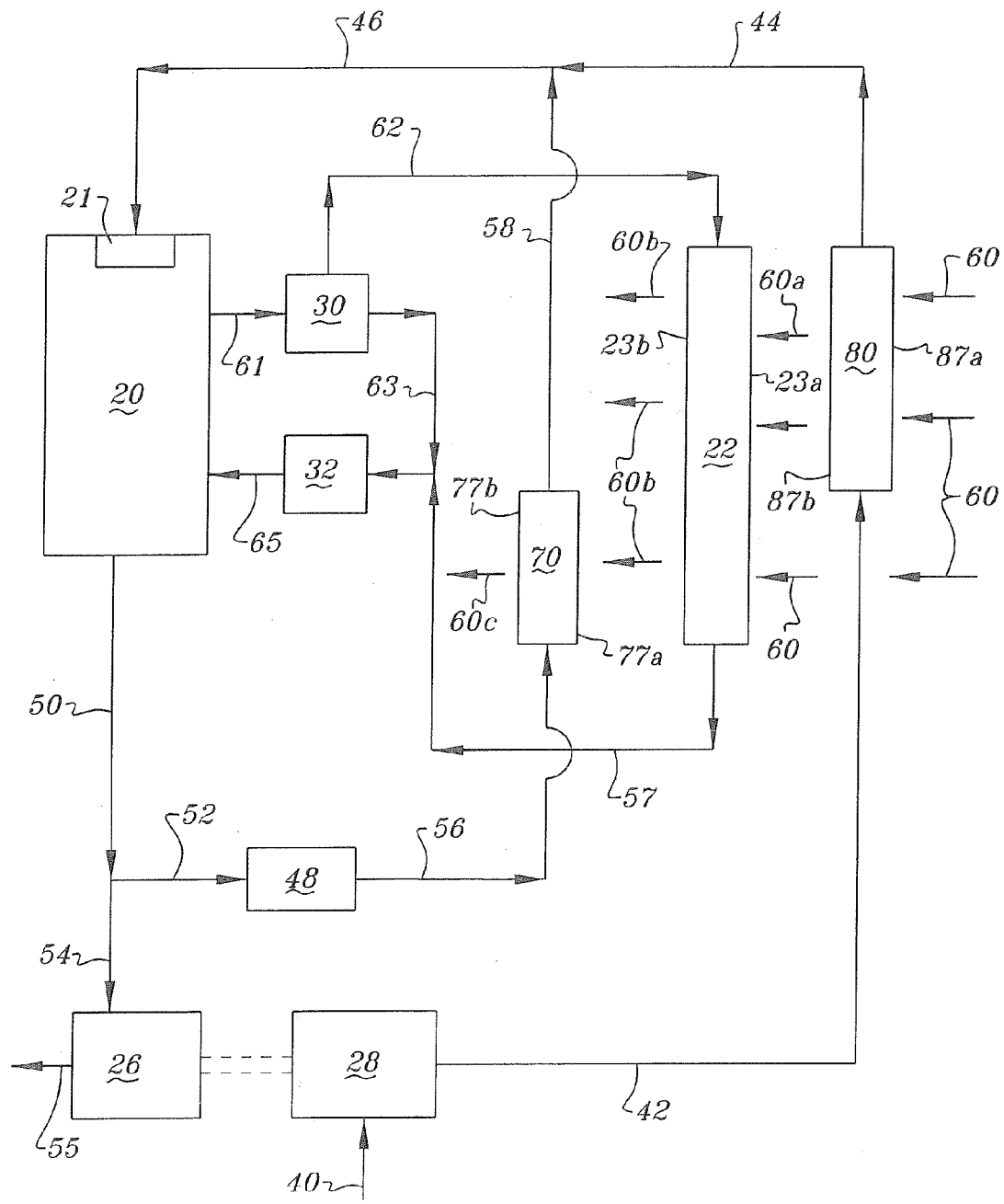
FIG. 6 is a partially schematic view of another embodiment of the internal combustion engine cooling system of the present invention showing in side elevational view the relative placement of an exhaust gas cooler and a charge air cooler with respect to the radiator.

FIG. 6 depicts another embodiment of the cooling system of the present invention. Instead of combining the exhaust gas cooler with the charge air cooler in a common unit adjacent the same face of the radiator, exhaust gas cooler 70 is placed adjacent the face of the radiator opposite the charge air cooler, which is disposed near the upper end of the radiator. As with the previous embodiment, charge air cooler 80 is disposed upstream of radiator 22 so that ambient air 60 passes through front face 87a and out of rear face 87b as partially heated ambient air 60a. The height of the charge air cooler 80 is less than that of radiator 22, so that a portion of radiator 22 (here shown as the lower portion) receives ambient air 60 which does not pass through the charge air cooler. The remaining portions of the radiator 22 receive ambient air 60a which has been heated partially by passage in series through charge air cooler 80. Disposed downstream of radiator 22 is exhaust gas cooler 70, here shown disposed adjacent to the lower portion of the radiator 22 which receives the unheated ambient air 60. The ambient air 60b partially heated after passage through rear face 23b of radiator 22 then passes in series through the front face 77a and the fins and tubes of exhaust gas cooler 70, and exits 60c at a higher temperature from rear face 77b. However, the difference in temperature between the exhaust gas and the heated cooling air 60b is still sufficient to allow good heat transfer. The cooled exhaust gas exits the cooler 70 and passes through line 58 where it combines with the cooled charge air in line 44. The combined mixture then passes through line 46 into engine intake manifold 21.

The height $h_1$ of charge air cooler 80 and the height $h_2$ of exhaust gas cooler 70 are preferably selected so that the combined height $h_1+h_2$ is approximately equal to the height of radiator 22, and the two coolers 70, 80 do not overlap with each other. Placing the exhaust gas cooler behind the radiator in this embodiment improves the radiator cooling performance by avoiding heating of the radiator by the exhaust gas cooler. As with the previous embodiment, exhaust gas cooler 70 is made of stainless steel or other high temperature-resistant material and the charge air cooler 80 is made of lower cost aluminum.

Figure 7:
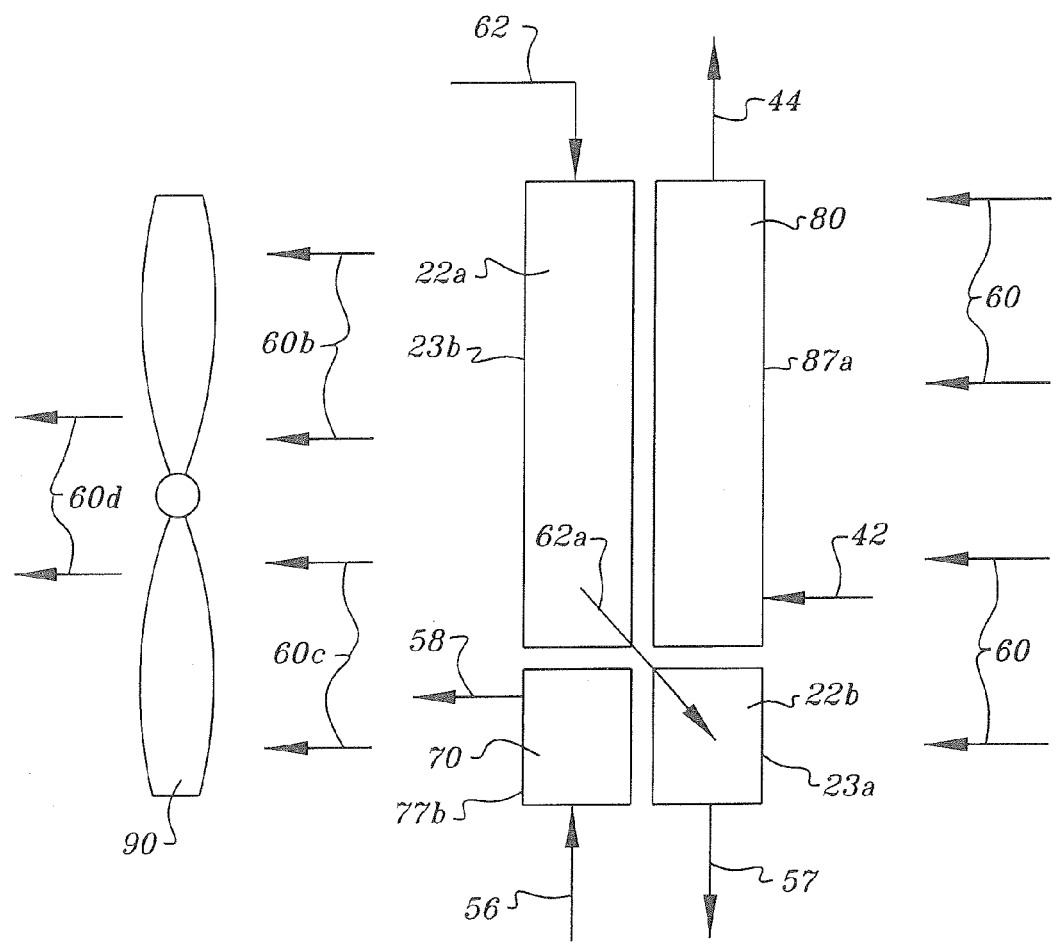
FIG. 7 is a side elevational view of a modification of the radiator/charge air cooler and exhaust gas cooler package of FIG. 6, where the radiator is split into two units, and the entire package is two cores deep.

A modification of the embodiment of FIG. 6 is shown in FIG. 7, where charge air cooler 80 and exhaust gas cooler 70 are the same, but the radiator is split into two different portions or units, upper rear unit 22a and lower front unit 22b, in a manner similar to that shown in U.S. Patent Publication No. US2005-0109484-A1, the disclosure of which is hereby incorporated by reference. In the front (with respect to ambient air flow 60), charge air cooler 80 is above and has front and rear faces substantially planar with those of lower radiator unit 22b, and in the rear exhaust gas cooler 70 is below and has front and rear faces substantially planar with those of upper radiator unit 22a. Variations in core depth in the individual units may change the planar alignment slightly. The heights and widths of upper radiator unit 22a and charge air cooler 80 are substantially the same, as are the heights and widths of lower radiator unit 22b and exhaust gas cooler 70. Each radiator unit 22a, 22b has a construction similar to the full radiator previously described above, but with shorter height. As in the case of the CAC and EGR coolers described in FIG. 5, the core of each unit 22a, 22b may be varied in depth, type of fins, fin spacing and count, and tube spacing and count, compared to the other, to achieve the desired balance of thermal cooling properties in the package. An additional line 62a passes partially cooled engine coolant from upper unit 22a to lower unit 22b. The modification in FIG. 7 results in a combined radiator/CAC/EGR cooler package that is only two cores deep, as opposed to the three core deep package of FIG. 6. This saving in core depth has benefits in that fan 90 exhausting the heated ambient air 60d may be spaced farther back from the rear core face, and thereby provide for higher air flow and better air flow distribution over the entire core face of the heat exchanger package.

Figure 8:
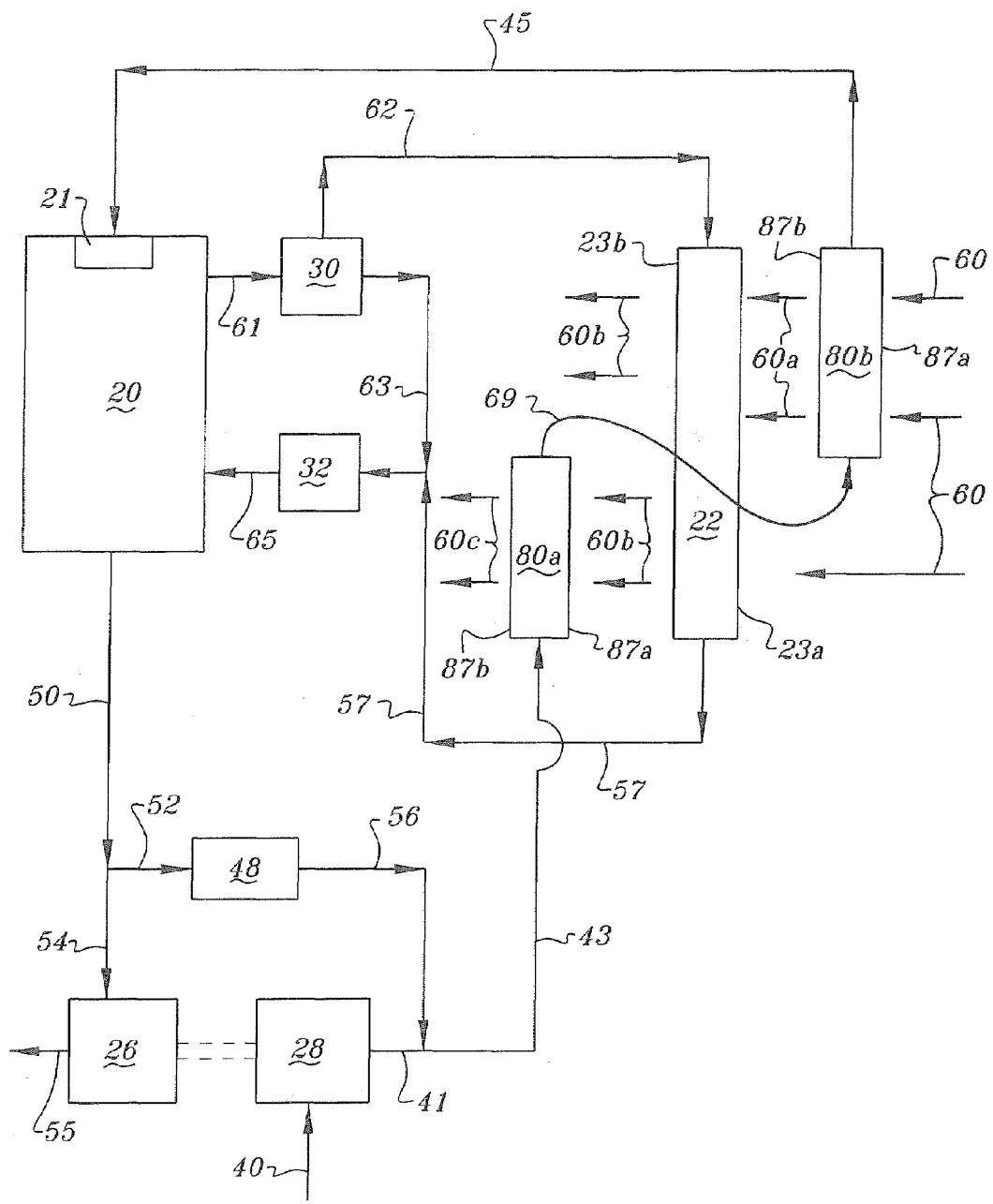
FIG. 8 is a partially schematic view of a further embodiment of the internal combustion engine cooling system of the present invention showing in side elevational view the relative placement of combined exhaust gas and charge air coolers with respect to the radiator.

A further embodiment of the present invention is depicted in FIG. 8. Instead of cooling the exhaust gas and heated charge air in separate heat exchangers, the heated exhaust gas from line 56 is combined with the heated charge air exiting the compressor in line 41, and the mixture of heated exhaust gas and charge air passes through line 43 to first combined exhaust gas and charge air cooler 80a. Combined exhaust gas and charge air cooler 80a is disposed downstream of radiator 22, in a location corresponding to the lower portion of the radiator 22 that receives fresh ambient cooling air 60 through front face 23a. After ambient air 60 passes through the radiator rear face 23b and exits as partially heated ambient air 60b, it then passes in series through the front face 87a and the fins and tubes of the combined cooler 80a and exits as heated ambient air 60c from the rear face 87b. The combined cooler 80a is constructed in a manner similar to charge air cooler 80 shown in FIG. 5, except that it is made of stainless steel or other high temperature-resistant material instead of aluminum since it is carrying gases at a higher temperature.

As it exits cooler 80a, the combined exhaust gas and charge air is partially cooled. It then travels through line 69 where it then enters a second combined exhaust gas and charge air cooler 80b, disposed upstream of radiator 22. Combined cooler 80b is shown adjacent the front face 23a, near the upper portion of radiator 22 so that it does not overlap with the first combined cooler 80A adjacent the rear face 23b, near the lower portion of radiator 22. The partially cooled combined exhaust gas and charge air is then subject to maximum cooling by ambient air 60, which passes through the front face 87a and the tubes and fins of cooler 80b, and exits rear face 87b as heated ambient air 60a to cool radiator 22 in series. The arrangement of this split exhaust gas and charge air cooler is similar to that of the split charge air cooler disclosed in U.S. Patent Publication No. US2005-0109483-A1, the disclosure of which is hereby incorporated by reference. The cooled combined exhaust gas and charge air then exits cooler 80b through line 45 to intake manifold 21. Since the combined exhaust gas and charge air received in cooler 80b is already partially cooled, cooler 80b does not need to be made of stainless steel or other high temperature-resistant material, and can be made of aluminum. Preferably, heights and locations of coolers 80a and 80b are selected so that they do not overlap with one another, and their combined heights are approximately equal to the height of radiator 22. Additionally, the core styles, i.e., the core depth, the type of fins, the fin spacing and count, and the tube spacing and count, may be varied and tailored for each unit 80a, 80b, to obtain the desired air flow split and unit performance. For example, the front unit 80b may have a lower fin count and/or core depth (the latter shown by the reduced core depth of front face 87a') to limit the heating of the ambient air that passes through the core of the radiator, whereas the rear unit 80a may have a higher fin count and/or core depth (the latter shown by the increased core depth of rear face 87b') to derive maximum cooling of the combined exhaust gas and charge air. Effects of variation in core parameters are discussed further below. This system and method provides maximum heat transfer performance with material cost savings over the prior art system and method of FIG. 2 because at least half of the combined exhaust gas and charge air cooler can be made with the lower cost aluminum construction.

Figure 9:
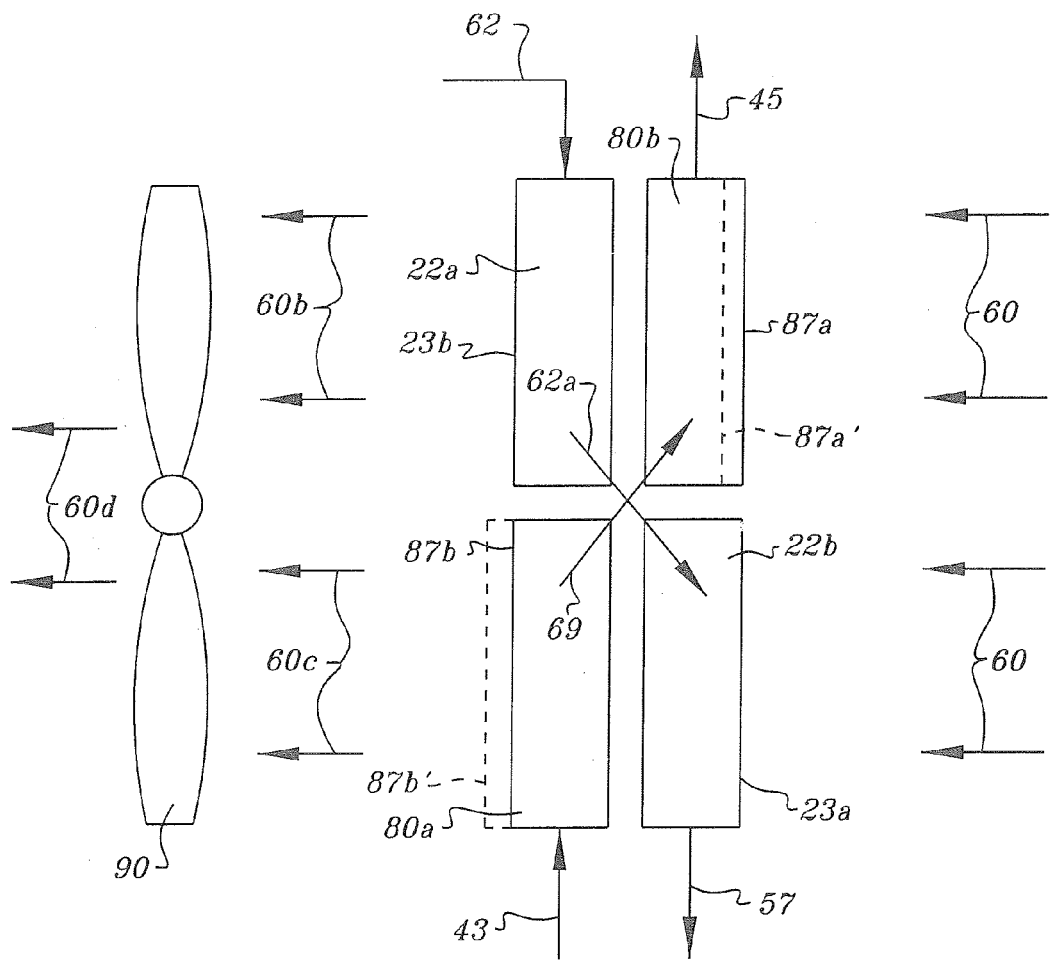
FIG. 9 is a side elevational view of a modification of the radiator/charge air cooler and exhaust gas cooler package of FIG. 8, where the radiator is split into two units, and the entire package is two cores deep.

FIG. 9 shows a modification of the embodiment of FIG. 8. In a manner similar to the modification of FIG. 7, the radiator is split into two units 22a, 22b, with connecting line 62a, so that the combined radiator/CAC/EGR cooler package is only two cores deep with respect to ambient air flow 60. Again, the front and rear faces of the vertically matched units 80b, 22b and 22a, 80a, respectively, are in substantially the same planes (except for any variations in core depth in the individual units) and the heights and widths of the horizontally matched units, 22a, 80b and 80a, 22b, respectively, are substantially the same. This again saves space and permits more optimal mounting of fan 90 for better flow through the package of the cooling ambient air.

In a packaged group of heat exchangers, as depicted in FIGS. 4, 6, 7, 8 and 9, it is particularly important to manage the airflow splits among the various heat exchangers in order to achieve optimum heat transfer performance. In a package with split radiator and split charge air cooler as shown in FIG. 9, it may be desirable, in order to achieve optimum radiator performance, to manage the cooling airflow through the front charge air cooler by lowering its core resistance. This will result in the minimum impact of the front charge air cooler upon the radiator core behind, and will provide optimized cooling airflow to the radiator, resulting in optimum radiator heat transfer.

The flow of cooling air through a heat exchanger core, for example the cores of radiator units 22a, 22b and charge air cooler units 80a, 80b, may be managed in a number of different ways, each affecting the core airflow resistance or the airflow resistance of the entire airflow path. For example, airflow through a given heat exchanger may be increased by increasing the core resistance of a heat exchanger in parallel with it or by decreasing its own core resistance or the core resistance of a heat exchanger in series with it. Various core parameters may be varied in any of the heat exchangers of FIGS. 4, 6, 7, 8 and 9 to achieve a fin/tube system with the desired cooling airflow resistance.

Figure 10:
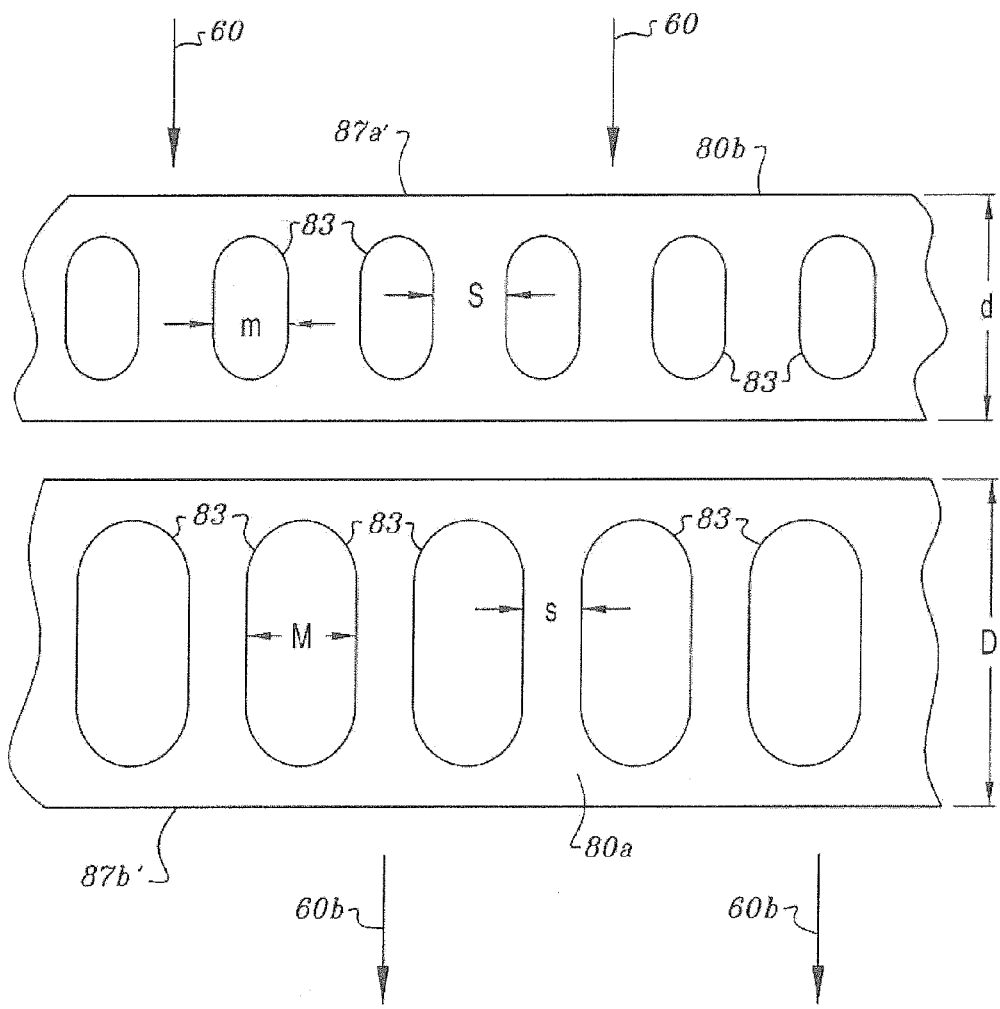
FIG. 10 is a sectional plan view of portions of the cores of the upper and lower combined EGR/CAC radiator units of FIG. 9 showing differences in tube spacing, tube minor diameter and core depth.
Figure 11:
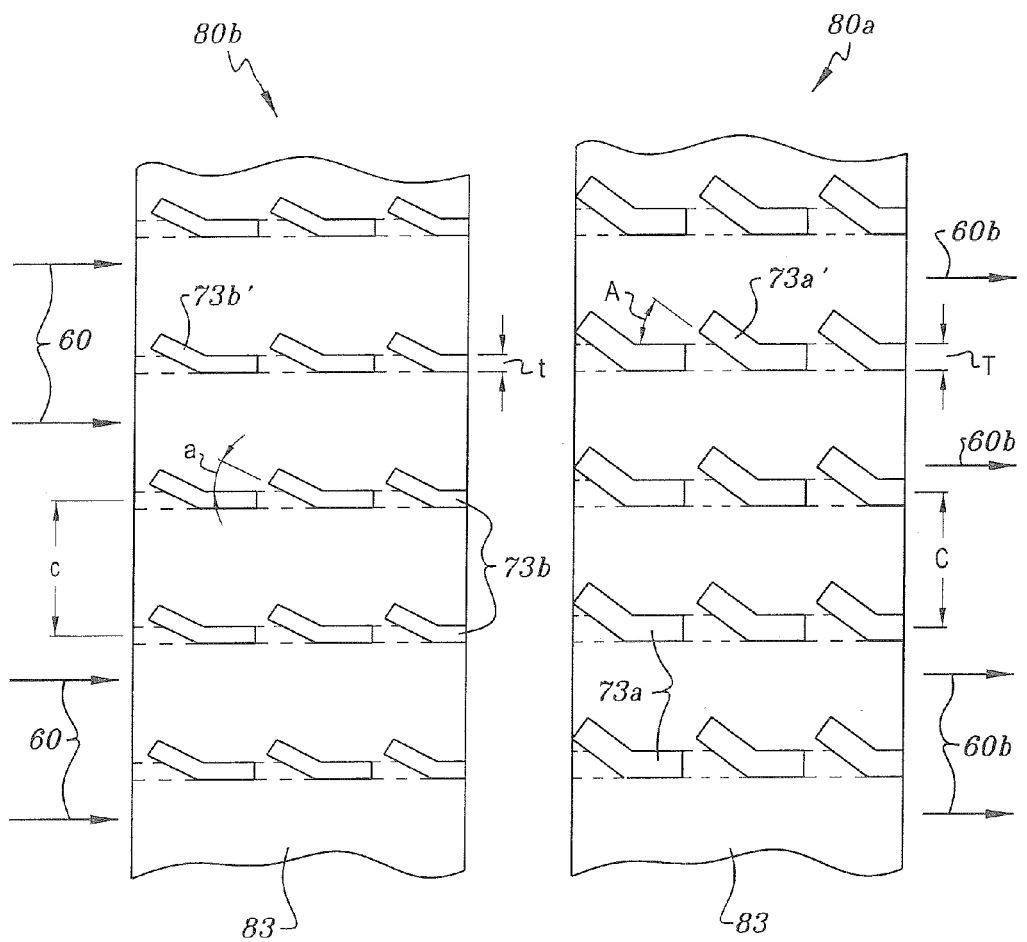
FIG. 11 is a sectional elevational view of portions of the cores of the upper and lower combined EGR/CAC radiator units of FIG. 9 showing differences in fin count, fin thickness and fin louver angle.

As described above in connection with FIG. 9, and as shown in FIG. 10 where the cores of the upper and lower combined EGR/CAC units are juxtaposed for comparison, a decreased depth d of the core of upper combined exhaust gas and charge air cooler unit 80b (in front of the upper radiator unit) decreases core resistance and increases cooling airflow, while increased core depth D of lower combined exhaust gas and charge air cooler unit 80c (behind the lower radiator unit) increases core resistance and decreases cooling airflow. Also, increased CAC tube 83 spacing S and smaller CAC tube 83 minor diameter m on unit 80b (both measured in a direction across the face of the core) decrease core resistance and increase cooling airflow, whereas decreased tube spacing s and increased tube minor diameter M on unit 80a increase core resistance and decrease cooling airflow. Variations to the core fins also affect cooling airflow resistance. For example, as shown in FIG. 11 with the cores of EGR/CAC units 80a and 80b again juxtaposed, increased fin 73a count per unit vertical distance C, increased fin louver 73a' angles A and increased fin thickness T on unit 80a increase core resistance and decrease cooling airflow, as compared to the decreased fin 73b count per unit vertical distance c, decreased fin louver 73b' angles a and decreased fin thickness t on unit 80b. The use of louvered fins 73a', 73b' increases core resistance and decreases cooling airflow as compared to flat, dimpled or wavy style fins.

Each radiator unit 22a, 22b in FIG. 9 likewise may have different core styles, such as core depth, type of fins, fin spacing, fin count, tube spacing and tube count, in the same manner as described in connection with the EGR/CAC units.

The core area of the EGR, CAC and radiator cores has a direct effect on airflow management, but in a much more complex manner than the items mentioned above. In the embodiment shown in FIG. 9, the charge air cooler core areas may be the same as the radiator core areas, i.e., be fully overlapping with respect to cooling air flow. On the other hand, the charge air cooler cores may extend beyond the radiator core areas in one or more directions, i.e., be overhanging or non-overlapping with respect to cooling air flow, or the radiator core areas may extend beyond those of the charge air coolers in any direction. The airflow resistance of a given core is inversely proportional to its area. However, the greater the area of a heat exchanger which is overlapped by another heat exchanger, the greater will be the airflow resistance of the two heat exchangers. Increased overlapping results in increased airflow resistance and increased overhanging results in decreased airflow resistance through the heat exchangers in the package.

It has been found that the static head loss through the heat exchanger package along each airflow path is equivalent. Thus, face velocities that drive convection increase or decrease to achieve this balance. The split radiator and charge air cooler configurations having multiple different fin/tube systems provide the flexibility to modify air velocities for best results. Optimized application-specific results may be obtained not only through heat exchanger core arrangements, but also through use of different fin/tube systems in each heat exchanger unit.

Figure 12:
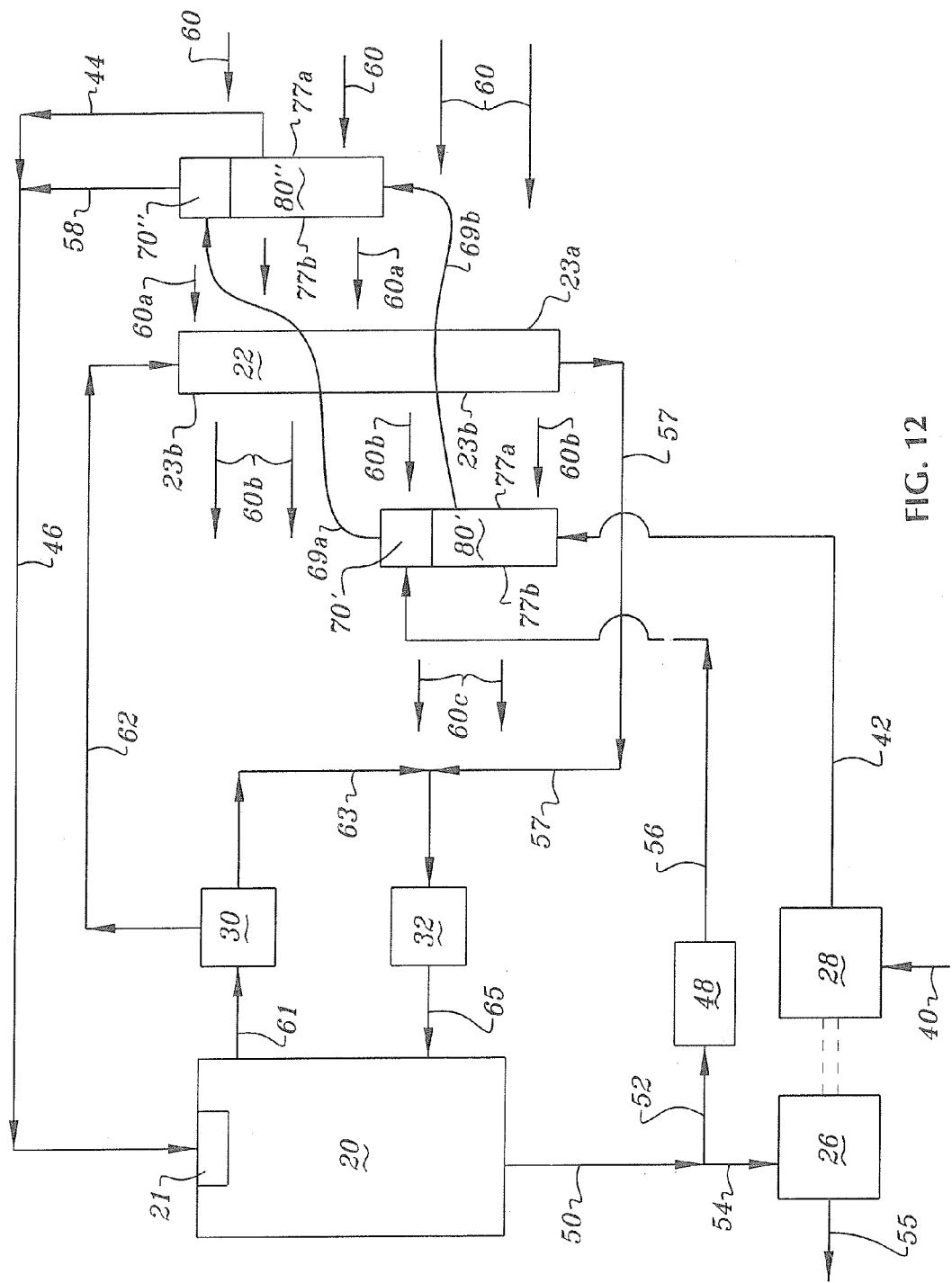
FIG. 12 is a partially schematic view of yet another embodiment of the internal combustion engine cooling system of the present invention showing in side elevational view the relative placement of exhaust gas and charge air coolers with respect to the radiator.

A further embodiment of the present invention which combines some of the characteristics of previous embodiments is depicted in FIG. 12. In a manner similar to the embodiment of FIG. 4, the exhaust gas and heated charge air are not combined, but are instead cooled in connected parallel heat exchangers located adjacent to the radiator. However, in a manner similar to that of the embodiment of FIG. 8, the heat exchangers for each of the exhaust gas and charge air are split into units downstream and upstream of radiator 22. Recirculated exhaust gas from line 56 is first cooled in exhaust gas cooler 70' downstream of radiator 22, and, separately, heated charge air from line 42 is first cooled in charge air cooler 80', in parallel with cooler 70' and also downstream of the radiator. The downstream exhaust gas and charge air coolers 70' and 80', respectively, are connected to form a single unit like that shown in FIG. 5, except that they are inverted, so that the exhaust gas cooler portion is above the charge air cooler portion. As with the previous description of the embodiment of FIG. 5, the exhaust gas cooler 70' is made of stainless steel or other high temperature-resistant material, since it receives the hotter exhaust gas, and the charge air cooler unit 80' is made of aluminum. The exhaust gas cooler 70' and charge air cooler unit 80' are located along the lower portion adjacent to and downstream of rear face 23b of radiator 22, corresponding to the region in which radiator 22 receives unheated ambient air 60. The partially heated ambient air 60b from the lower portion of radiator 22 passes in series through front face 77a and the tubes and fins of both exhaust gas cooler 70' and charge air cooler 80', and exits as further heated ambient air 60c from the rear face 77b of coolers 70'/80'.

The partially cooled exhaust gas then exits exhaust gas cooler 70' through line 69a, where it enters the inlet of second, upstream exhaust gas cooler 70". The partially cooled charge air exits downstream charge air cooler 80' and travels through line 69b to the inlet of second, upstream charge air cooler 80". Ambient air 60 passes through the front face 77a of both coolers 70" and 80", located adjacent the upper portion of the radiator, to respectively cool the exhaust gas and charge air. The partially heated ambient air 60a then exits the rear face 77b of coolers 70"/80" and passes in series through the front face 23a at the upper portion of radiator 22. The cooled exhaust gas then exits from exhaust gas cooler 70" through line 58, and the cooled charge air exits from charge air cooler 80" through line 44, and are combined and passed through line 46 to engine intake manifold 21.

The upstream exhaust gas cooler 70" and charge air cooler 80" are also constructed in connected parallel units 70"/80" similar to that shown in FIG. 5, except inverted. However, since the exhaust gas is already partially cooled, it does not have an excessively high temperature. Therefore, the upstream exhaust gas cooler 70' need not be made of stainless steel or other high temperature-resistant material, and may be constructed of aluminum, similar to that of charge air cooler 80". The location and combined height of the downstream exhaust gas and charge air coolers 70'/80' and the location and combined height of the upstream exhaust gas and charge air coolers 70"/80" are selected so that the downstream and upstream connected units do not overlap with one another, and so that the sum of the combined heights of the units is approximately equal to the height of the radiator. As with the other embodiments previously described, core styles such as core depth, type of fins, fin spacing and count, and tube spacing and count may be varied and tailored for each unit 70', 70", 80', 80", to obtain the desired heat transfer performance.

Figure 13:
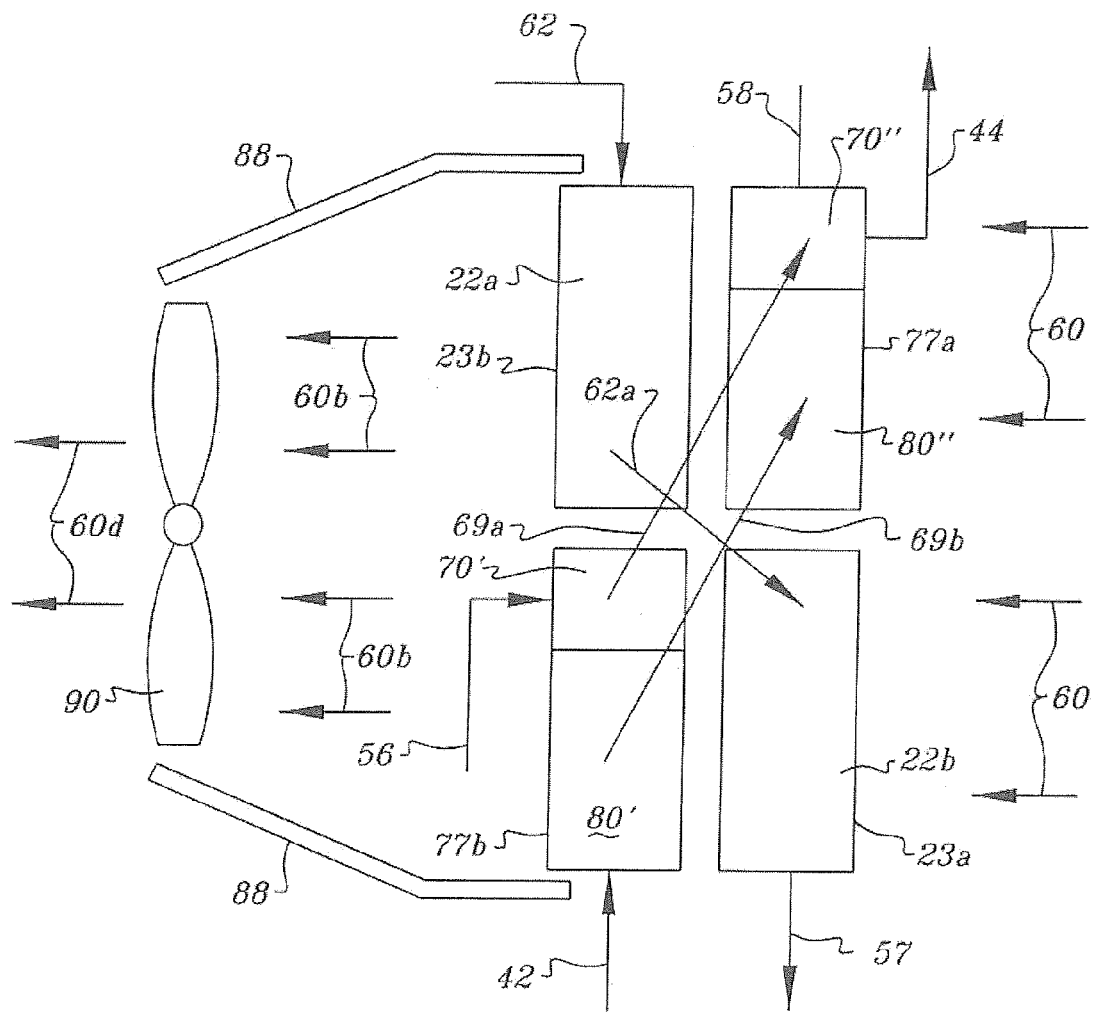
FIG. 13 is a side elevational view of a modification of the radiator/charge air cooler and exhaust gas cooler package of FIG. 12, where the radiator is split into two units, and the entire package is two cores deep.

In a modification similar to those of FIGS. 7 and 9, FIG. 13 shows a modification of the embodiment of FIG. 12 in which the radiator is again split into two units 22a, 22b, connected by line 62a, so that the combined-radiator/CAC/EGR cooler package is only two cores deep to reduce package space and improve ambient air flow by fan 90. The front and rear faces of the vertically matched units 70", 80", 22b and 22a, 70', 80', respectively, are in the substantially the same planes, except for any variations in core depth. The heights and widths of the horizontally matched units, 22a, 70"/80" and 70'/80', 22b, respectively, are substantially the same.

In this system and method shown in FIGS. 12 and 13, only the first exhaust gas cooler 70' need be made of stainless steel or other high temperature-resistant material, while the other three coolers 70", 80' and 80" can all be made of lower cost aluminum construction, thus resulting in material cost savings. The heat transfer performance of this system and method will be substantially the same as that of FIGS. 8 and 9 and far superior to the prior art system and method shown in FIG. 2. As with the embodiments shown in FIGS. 4, 6, 7, 8 and 9, the core, tube and fin parameters of the radiator and connected EGR/CAC units in FIGS. 12 and 13 may be varied to modify the air flow as desired through the individual heat exchanger units.

Additionally, the direction of flow of engine coolant through the radiator unit(s), and/or the direction of flow of the exhaust gas and charge air through the ERG/CAC units, may be reversed as desired to achieve desired thermal performance. For example, in the embodiments of FIGS. 9 and 12, the combined EGR/CAC air flow may be reversed, so that all of the radiator and combined EGR/CAC units are downflow units.

Cooling air flow through any of the heat exchanger packages shown in FIGS. 4, 6, 7, 8, 9, 12 and 13 may be increased by the use of a fan shroud 88 (FIG. 13) enclosing the area between fan 90 and the heat exchangers, and by moving fan 90 away from the rear face of the heat exchangers so that fan penetration into the enclosure results in optimized static efficiency. Here, orifice condition on the shroud as well as the static head loss presented to the fan along each airflow path of the cooling system determines total airflow. In this manner there can be presented to the fan a uniform or non-uniform resistance to airflow to create airflow splits that optimize cooling air approach differential and maximize temperature potential where needed to achieve system performance requirements. While it is difficult to achieve this in crowded vehicle engine compartments, the heat exchanger packages of the present invention facilitate this goal. In particular the split radiator/split charge air cooler heat exchanger packages of FIGS. 9 and 13 provide significant improvement since they are only two cores deep as opposed to single radiator/split charge air cooler arrangements, which are three cores deep. In addition, splitting the CAC and radiator, with the use of multiple fin/tube systems, provides a high degree of flexibility in creating airflow splits that can be customized to meet the needs of each individual application.

Thus, the present invention provides an improved system and method of cooling an internal combustion engine, including charge air cooling and exhaust gas cooling, which achieves cooling of the charge air and the recirculated exhaust gas to near ambient temperatures, and which allows the use of lower cost materials for the charge air and exhaust gas coolers. Improved space saving packaging may be achieved by splitting the radiator and packaging the combined radiator, CAC and EGR cooler only two cores deep. Additionally, modifications to the core may be made to any individual heat exchanger unit within the package to best tailor thermal performance.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Having described the invention, what is claimed is:

1. A combined radiator and charge air cooler package comprising:
    a radiator for cooling engine coolant having opposite front and rear core faces through which ambient air flows, and opposite upper and lower ends adjacent the faces; and
    a charge air cooler for cooling charge air having upper and lower units, each charge air cooler unit having opposite front and rear core faces through which ambient air flows, and opposite upper and lower ends adjacent the faces;
    the upper charge air cooler unit being disposed in overlapping relationship and adjacent to the upper end of the radiator with the upper and lower ends of the upper charge air cooler unit being oriented in the same direction as the upper and lower ends of the radiator, wherein one face at the upper end of the radiator is disposed adjacent one face of the upper charge air cooler unit, such that the ambient air flows in series through the upper end of the radiator and the upper charge air cooler unit; and
    the lower charge air cooler unit being disposed in overlapping relationship and adjacent to the lower end of the radiator with the upper and lower ends of the lower charge air cooler unit being oriented in the same direction as the upper and lower ends of the radiator, wherein the other face at the lower end of the radiator is disposed adjacent one face of the lower charge air cooler unit, such that the ambient air flows in series through the lower charge air cooler unit and the lower end of the radiator, each charge air cooler unit having a different core style from the other, the core style being selected from the group consisting of core depth, type of fins, fin spacing, fin count, tube spacing and tube count; and
    the charge air cooler units being operatively connected such that the charge air flows therebetween.

2. The combined radiator and charge air cooler package of claim 1 wherein each charge air cooler unit has a different core depth from the other.

3. The combined radiator and charge air cooler package of claim 1 wherein each charge air cooler unit has a different type of fin from the other.

4. The combined radiator and charge air cooler package of claim 1 wherein each charge air cooler unit has a different fin spacing from the other.

5. The combined radiator and charge air cooler package of claim 1 wherein each charge air cooler unit has a different fin count from the other.

6. The combined radiator and charge air cooler package of claim 1 wherein each charge air cooler unit has a different tube spacing from the other.

7. The combined radiator and charge air cooler package of claim 1 wherein each charge air cooler unit has a different tube count from the other.

8. The combined radiator and charge air cooler package of claim 1 wherein at least one of the charge air cooler units includes cooling for recirculated exhaust gas.

9. A combined radiator and charge air cooler package comprising:
    a radiator having upper and lower units for cooling engine coolant, each radiator unit having opposite front and rear core faces through which ambient cooling air flows, a depth between the front and rear faces, and opposite upper and lower ends adjacent the faces; and
    a charge air cooler having upper and lower units for cooling charge air, each charge air cooler unit having opposite front and rear core faces through which cooling air flows, and opposite upper and lower ends adjacent the faces,
    the upper charge air cooler unit being disposed in overlapping relationship and adjacent to the upper radiator unit with the upper and lower ends of the upper charge air cooler unit being oriented in the same direction as the upper and lower ends of the upper radiator unit, wherein one face of the upper radiator unit is disposed adjacent one face of the upper charge air cooler unit, such that the ambient air flows in series through the upper radiator unit and the upper charge air cooler unit; and
    the lower charge air cooler unit being disposed in overlapping relationship and adjacent to the lower radiator unit with the upper and lower ends of the lower charge air cooler unit being oriented in the same direction as the upper and lower ends of the lower radiator unit, wherein the other face of the lower radiator unit is disposed adjacent one face of the lower charge air cooler unit, such that the ambient air flows in series through the lower charge air cooler unit and the lower radiator unit, each charge air cooler unit having a different core style from the other, the core style being selected from the group consisting of core depth, type of fins, fin spacing, fin count, tube spacing and tube count;
    the radiator units being operatively connected such that the engine coolant flows therebetween; and
    the charge air cooler units being operatively connected such that the charge air flows therebetween.

10. The combined radiator and charge air cooler package of claim 9 wherein each charge air cooler unit has a different core depth from the other.

11. The combined radiator and charge air cooler package of claim 9 wherein each charge air cooler unit has a different type of fin from the other.

12. The combined radiator and charge air cooler package of claim 9 wherein each charge air cooler unit has a different fin spacing from the other.

13. The combined radiator and charge air cooler package of claim 9 wherein each charge air cooler unit has a different fin count from the other.

14. The combined radiator and charge air cooler package of claim 9 wherein each charge air cooler unit has a different tube spacing from the other.

15. The combined radiator and charge air cooler package of claim 9 wherein each charge air cooler unit has a different tube count from the other.

16. The combined radiator and charge air cooler package of claim 9 wherein at least one of the charge air cooler units includes cooling for recirculated exhaust gas.

17. The combined radiator and charge air cooler package of claim 9 wherein each radiator unit has a different core style selected from the group consisting of core depth, type of fins, fin spacing, fin count, tube spacing and tube count.

* * * * *